US011290047B2

(12) United States Patent
Xia et al.

(10) Patent No.: US 11,290,047 B2
(45) Date of Patent: Mar. 29, 2022

(54) DC BUS DISCHARGE CONTROL METHOD AND SYSTEM, COMPUTER DEVICE, AND STORAGE MEDIUM

(71) Applicant: GAC AION NEW ENERGY AUTOMOBILE CO. LTD, Guangdong (CN)

(72) Inventors: Zhuliang Xia, Guangdong (CN); Wei Liu, Guangdong (CN); Xingkun Qin, Guangdong (CN); Huizhong Zhang, Guangdong (CN); Zhantu Liao, Guangdong (CN); Xiaokun Zhao, Guangdong (CN)

(73) Assignee: GAC AION NEW ENERGY AUTOMOBILE CO. LTD, Guangzhou (CN)

( * ) Notice: Subject to any disclaimer, the term of this patent is extended or adjusted under 35 U.S.C. 154(b) by 0 days.

(21) Appl. No.: 16/337,415

(22) PCT Filed: Aug. 31, 2018

(86) PCT No.: PCT/CN2018/103625
§ 371 (c)(1),
(2) Date: Mar. 28, 2019

(87) PCT Pub. No.: WO2019/119872
PCT Pub. Date: Jun. 27, 2019

(65) Prior Publication Data
US 2021/0328533 A1    Oct. 21, 2021

(30) Foreign Application Priority Data
Dec. 20, 2017    (CN) .......................... 201711385478.0

(51) Int. Cl.
*H02P 1/00*    (2006.01)
*H02P 3/00*    (2006.01)
(Continued)

(52) U.S. Cl.
CPC .............. *H02P 21/22* (2016.02); *H02P 27/08* (2013.01)

(58) Field of Classification Search
CPC ................................. H02P 21/22; H02P 27/08
(Continued)

(56) References Cited

U.S. PATENT DOCUMENTS

| 2014/0225537 A1* | 8/2014 | Omata | H02P 21/26 |
|---|---|---|---|
| | | | 318/400.02 |
| 2016/0089990 A1* | 3/2016 | Nishimura | B60L 50/51 |
| | | | 701/22 |

(Continued)

FOREIGN PATENT DOCUMENTS

| CN | 102223100 A | 10/2011 |
|---|---|---|
| CN | 104852658 A | 8/2015 |

(Continued)

OTHER PUBLICATIONS

Feng, Yi et al."Wind power grid-connected inverter control method based on proportional complex integral regulator". Transactions of the Chinese Society of Agricultural Engineering (Transactions of the CSAE). Jul. 31, 2016 (Jul. 31, 2016). vol. 32, No. 13. pp. 177-182.

*Primary Examiner* — Erick D Glass
(74) *Attorney, Agent, or Firm* — ScienBiziP, P.C.

(57) ABSTRACT

The present disclosure relates to a DC bus discharge control method, including that: an active discharge instruction is received; a motor current signal is acquired according to the active discharge instruction; the motor current signal is converted into a current signal in a stator coordinate system; a voltage control signal in the stator coordinate system is output based on the current signal in the stator coordinate system and a random current reference instruction of a preset stator coordinate system; and the voltage control signal in the stator coordinate system is converted into a (Continued)

three-phase voltage control signal, and a working state of a switching device is controlled according to the three-phase voltage control signal.

16 Claims, 5 Drawing Sheets

(51) Int. Cl.
*H02P 7/06* (2006.01)
*H02P 21/22* (2016.01)
*H02P 27/08* (2006.01)

(58) Field of Classification Search
USPC .......................................................... 318/494
See application file for complete search history.

(56) References Cited

U.S. PATENT DOCUMENTS

| 2016/0226410 | A1 | 8/2016 | Lopez De Arroyabe |
| 2019/0296669 | A1* | 9/2019 | Yamaguchi ........... H02P 29/025 |
| 2021/0083614 | A1* | 3/2021 | Krug ................... H02M 5/4585 |

FOREIGN PATENT DOCUMENTS

| CN | 105270182 A | 1/2016 |
| CN | 106230243 A | 12/2016 |
| CN | 106505527 A | 3/2017 |

* cited by examiner

DC BUS DISCHARGE CONTROL METHOD AND SYSTEM, COMPUTER DEVICE, AND STORAGE MEDIUM

TECHNICAL FIELD

The present disclosure relates to the technical field of power systems, and more particularly to a DC bus discharge control method and system, a computer device, and a storage medium.

BACKGROUND

A high-voltage system of an electric product using a permanent magnet synchronous motor as a driving motor is composed of a power battery pack (high-voltage battery pack), a driving motor inverter (motor controller), a permanent magnet synchronous motor and other high-voltage electric appliances. Each electric appliance generally has an energy storage capacitor on a high-voltage DC input side. In the case of a serious fault, an internal relay of the power battery pack is turned off to stop supplying power to a high-voltage loop, but it would cause a high voltage on capacitor on a high-voltage DC bus due to the residual power, which may cause an electric shock to a contact person. Therefore, to comply the safety specification it requires that after the Internal relay of the battery pack is turned off, the residual power of the high-voltage DC bus needs to be discharged quickly (for example, within 2s) by a certain method (for example, lower than 60V). This discharge process is called active discharge of the high-voltage system.

In a current active discharge method of the high-voltage system, a rotor position sensor (such as a resolver) is required to acquire a rotor angle of a permanent magnet synchronous motor, and then a stator current (only D-axis current, no Q-axis current) is controlled according to the rotor angle to prevent the stator current from generating a mechanical torque. However, due to the impossibility of preventing a stator current from generating a mechanical torque when a rotor position sensor fails, residual power on a high voltage DC bus cannot be quickly discharged.

SUMMARY

In view of the above, a DC bus discharge control method and system, a computer device, and a storage medium are provided to solve the problem that residual power on a high voltage DC bus cannot be quickly discharged due to the impossibility of preventing a stator current from generating a mechanical torque when a rotor position sensor fails.

A DC bus discharge control method includes operations as follows.

An active discharge instruction is received.

A motor current signal is acquired according to the active discharge instruction.

The motor current signal is converted into a current signal in a stator coordinate system.

A voltage control signal in the stator coordinate system is output based on the current signal in the stator coordinate system and a random current reference instruction of a preset stator coordinate system.

The voltage control signal in the stator coordinate system is converted into a three-phase voltage control signal, and a working state of a switching device is controlled according to the three-phase voltage control signal.

In one of the embodiments, the method further includes an operation as follows. When detecting that a voltage on a DC bus is lower than a preset value, the switching device is controlled to be turned off.

In one of the embodiments, a random current reference signal of the random current reference instruction includes an α-axis component current and a β-axis component current, where a desired value of the α-axis component current is 0, a desired value of the β-axis component current is 0, a variance of the α-axis component current is equal to a variance of the β-axis component current, and a covariance of the α-axis component current and a covariance of the β-axis component current are 0.

In one of the embodiments, the operation of converting the voltage control signal in the stator coordinate system into the three-phase voltage control signal and controlling the working state of the switching device according to the three-phase voltage control signal further includes operations as follows.

The voltage control signal in the stator coordinate system is converted into the three-phase voltage control signal by Inverse Clarke transformation.

Pulse Width Modulation (PWM) is performed on the three-phase voltage control signal to generate a PWM signal.

The working state of the switching device is controlled by using the PWM signal.

In one of the embodiments, the motor current signal is converted into the current signal in the stator coordinate system by Clarke transformation.

In one of the embodiments, a DC bus discharge control system includes:

an active discharge instruction receiving module, configured to receive an active discharge instruction;

a signal acquisition module, configured to acquire a motor current signal according to the active discharge instruction;

a signal conversion module, configured to convert the motor current signal into a current signal in a stator coordinate system;

a signal output module, configured to output a voltage control signal in the stator coordinate system based on the current signal in the stator coordinate system and a random current reference instruction of a preset stator coordinate system; and a control module, configured to convert the voltage control signal in the stator coordinate system into a three-phase voltage control signal, and control a working state of a switching device according to the three-phase voltage control signal.

In one of the embodiments, the system further includes: a detection module, configured to control, when detecting that a voltage on a DC bus is lower than a preset value, the switching device to be turned off.

In one of the embodiments, the control module includes:

a signal conversion unit, configured to convert the voltage control signal in the stator coordinate system into the three-phase voltage control signal by inverse Clarke transformation;

a signal modulation unit, configured to perform PWM on the three-phase voltage control signal to generate a PWM signal; and a control unit, configured to control the working state of the switching device by using the PWM signal.

In one of the embodiments, a computer device includes a memory, a processor and a computer program that is stored on the memory and can be run on the processor, wherein the computer program is executed by the processor to implement the DC bus discharge control method.

In one of the embodiments, a storage medium has a computer program stored thereon, wherein the computer program is executed by a processor to implement the DC bus discharge control method.

According to the DC bus discharge control method and system, the computer device, and the storage medium, a voltage control signal in a stator coordinate system is output by a current signal in the stator coordinate system and a random current reference instruction of a preset stator coordinate system to control a working state of a switching device, so that a motor control is discharged. The problem that residual power on a high voltage DC bus cannot be quickly discharged due to the impossibility of preventing a stator current from generating a mechanical torque when a rotor position sensor fails is solved.

DETAILED DESCRIPTION OF THE EMBODIMENTS

In order to make the purposes, technical solutions and advantages of the present disclosure clearer, the present disclosure will be further described in detail below with reference to the accompanying drawings and embodiments. It is to be understood that the specific embodiments described herein are merely illustrative of the present disclosure and are not intended to limit the scope of protection of the present disclosure.

Figure 1:
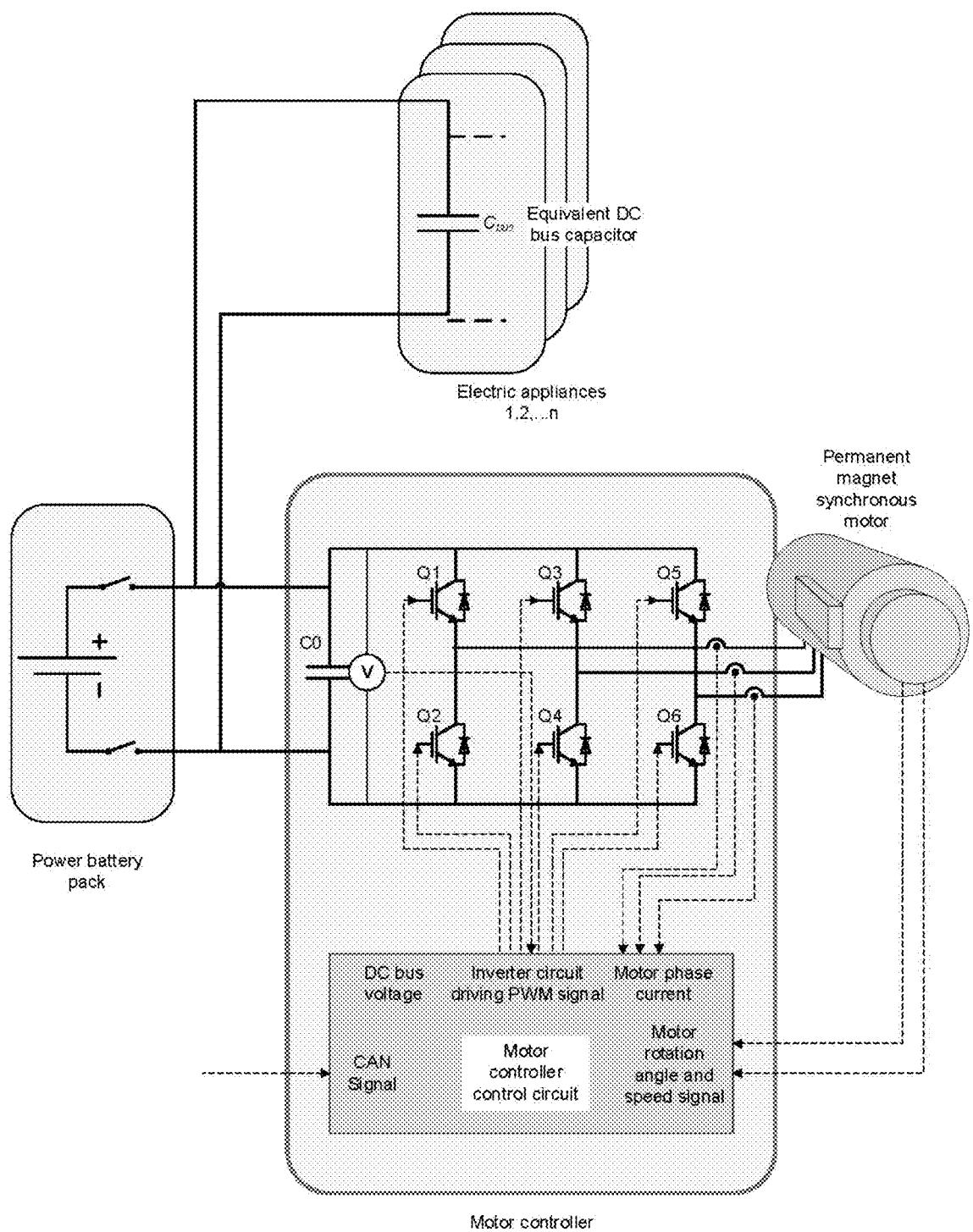
FIG. 1 is a schematic diagram of a high-voltage system of an electric vehicle and a motor controller according to the present disclosure.

Referring to FIG. 1, a high-voltage system of an electric vehicle using a permanent magnet synchronous motor as a driving motor is composed of a power battery pack (high-voltage battery pack), a driving motor inverter (motor controller), a permanent magnet synchronous motor and other high-voltage electric appliances. Each electric appliance generally has an energy storage capacitor $C_{bus}$, C0 on a high-voltage DC input side. In the case of a serious fault, an internal relay of the power battery pack is turned off to stop supplying power to a high-voltage loop, but it would cause a high voltage on capacitor on a high-voltage DC bus due to the residual power. These high voltages pose potential safety risks for passengers and maintenance personnel. Therefore, to comply the vehicle safety specification, it requires that after the internal relay of the battery pack is turned off, the residual power of the high-voltage DC bus needs to be discharged quickly (for example, within 2s) by a certain method (for example, lower than 60V). This discharge process is called active discharge of the high-voltage system. Therefore, it is necessary to control, by a voltage controller, switches $Q_1$, $Q_2$, $Q_3$, $Q_4$, $Q_5$, and $Q_6$ to discharge the residual power on the high-voltage DC bus.

Figure 2:
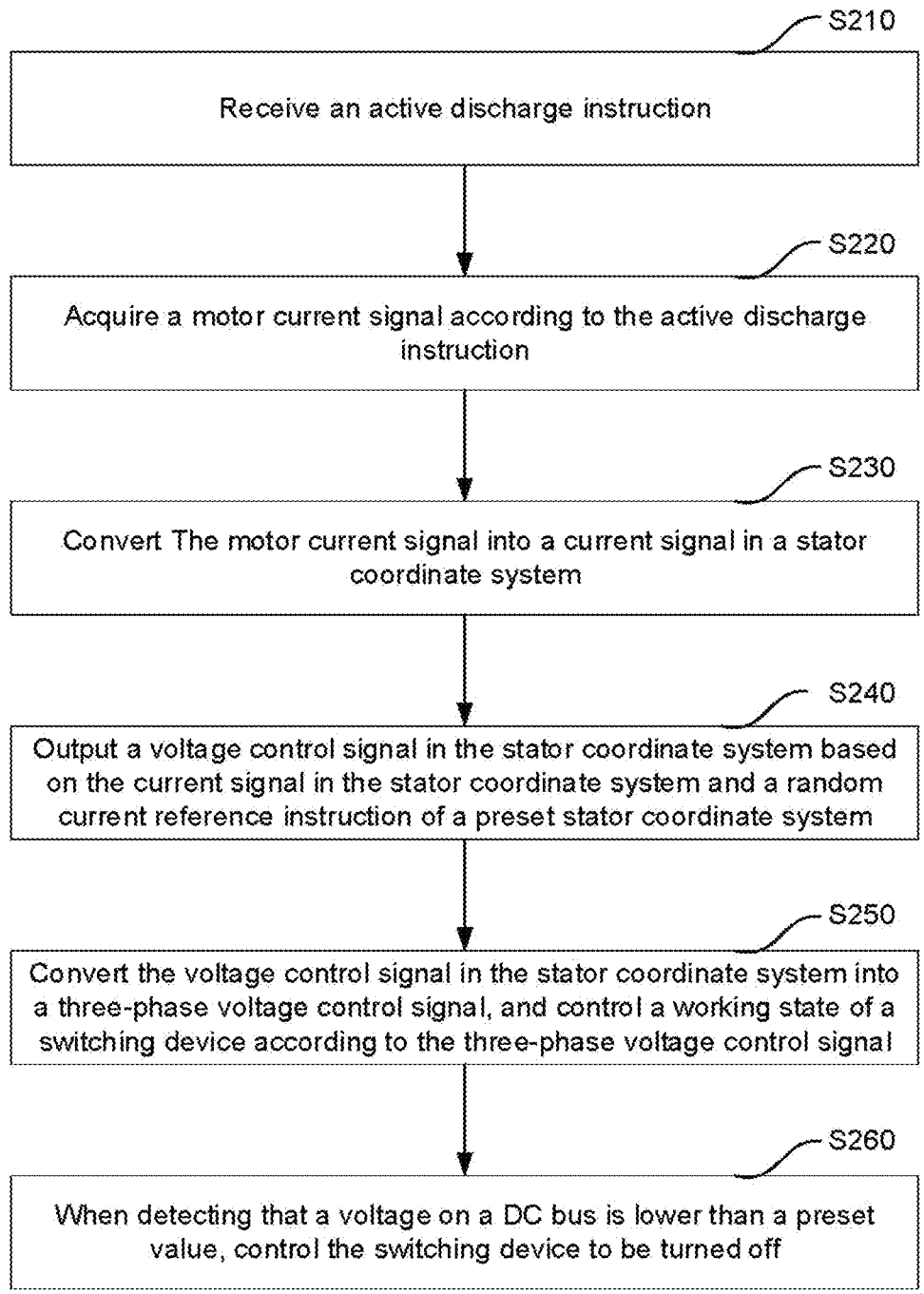
FIG. 2 is a flowchart of a DC bus discharge control method according to an embodiment of the present disclosure.

FIG. 2 shows a DC bus discharge control method in one embodiment. The method includes operation S210 to operation S250.

In operation S210, an active discharge instruction is received.

When it is necessary to discharge current on a high-voltage bus, a motor controller receives an active discharge instruction. The active discharge instruction may be issued by a Vehicle Control Unit (VCU). In the case of a vehicle failure and power-off of a high-voltage system of the vehicle, the VCU will issue an active discharge instruction.

In operation S220, a motor current signal is acquired according to the active discharge instruction.

The motor current signal is a motor three-phase current signal. When the active discharge instruction is received, the motor three-phase current signal may be acquired by a current sensor (detection apparatus, which can detect information of a measured current and can convert the detected information into an electrical signal or other information outputs in a required form complying with a certain standard requirement according to a certain rule, so as to meet information transmission, processing, storage, display, recording and control requirements).

In operation S230, the motor current signal is converted into a current signal in a stator coordinate system.

Current coordinates ($I_\alpha$, $I_\beta$) in the stator coordinate system directly correspond to three-phase currents ($I_a$, $I_b$, $I_c$) of the motor one by one, and a conversion relationship therebetween is a constant matrix, in which the matrix coefficients do not include a rotor rotation angle $\theta$. Such a coordinate system may be regarded as a coordinate system bound to a motor stator, so it is customarily called "stator coordinate system".

Specifically, the motor current signal includes an A phase current $I_a$, a B phase current $I_b$ and a C phase current $I_c$, and the motor current signal acquired by the current sensor is a three-phase current signal $I_a$, $I_b$, $I_c$. The three-phase current signal $I_a$, $I_b$, $I_c$ is transformed by Clarke transformation (the Clarke transformation simplifies an original three-phase current into a two-phase current, and transforms from a three-phase stator A-B-C coordinate system to a two-phase stator $\alpha$-$\beta$ coordinate system, also known as 3/2 transformation) (abc→$\alpha\beta$) into a current signal $I_\alpha$, $I_\beta$ in the stator coordinate system.

In operation S240, a voltage control signal in the stator coordinate system is output based on the current signal in the stator coordinate system and a random current reference instruction of a preset stator coordinate system.

The random current reference instruction of the preset stator coordinate system may be generated inside the controller, the random current reference instruction of the preset stator coordinate system includes random current reference value information, and a random current reference value of the preset stator coordinate system is $I_\alpha^* I_\beta^*$. The current signal $I_\alpha$, $I_\beta$ in the stator coordinate system and the random current reference value of the preset stator coordinate system $I_\alpha^* I_\beta^*$ in the random current reference instruction of the preset stator coordinate system are input a feedback control unit together. After the control operation, the feedback control unit outputs a voltage control signal $U_\alpha^* U_\beta^*$ in the stator coordinate system. The random current reference signal of the random current reference instruction includes an α-axis component current $I_\alpha^*$ and a β-axis component current $I_\beta^*$. The α-axis component current $I_\alpha^*$ and the β-axis component current $I_\beta^*$ may be random, and may be any random sequence as long as they satisfy: a desired value of the α-axis component current $I_\alpha^*$ is 0, a desired value of the β-axis component current $I_\beta^*$ is 0, a variance of the α-axis component current $I_\alpha^*$ is equal to a variance of the β-axis component current $I_\beta^*$, and a covariance of the α-axis component current $I_\alpha^*$ and a covariance of the β-axis component current $I_\beta^*$ are 0. The conditions to be met may be expressed as:

$$\begin{cases} E[I_\alpha^*] = 0 \\ E[I_\beta^*] = 0 \\ E[(I_\alpha^*)^2] = E[(I_\beta^*)^2] \\ E[I_\alpha^* I_\beta^*] = 0 \end{cases} \quad (1)$$

For example, $I_\alpha^* I_\beta^*$ may be independently selected according to the following uniform distribution:

$$f(i) = \begin{cases} \dfrac{1}{0.4 I_{rate}} & |i| \le 0.2 I_{rate} \\ 0 & |i| > 0.2 I_{rate} \end{cases} \quad (2)$$

f(i) is a probability density function of a current Instruction i.

Since the current control is generally the discrete control of a fixed frequency, each control cycle has a pair of random current Instructions, denoted as $I_{\alpha,k}^*$ and $I_{\beta,k}^*$, and a subscript k represents a $k^{th}$ control period. The relationship between random current Instructions between different periods may be expressed by a correlation function (or power density spectrum). The time series of $I_\alpha^*$ and $I_\beta^*$ of the present disclosure may be a white noise sequence, or may be a sequence having a specific correlation function designed for other specific purposes.

Specifically, the random current reference instruction of the preset stator coordinate system is a random white noise current.

During the discharge process, the random white noise current power spectrum is wide, and the high frequency part will increase the resistance loss due to the skin effect, thereby accelerating the residual power discharge speed. Since a current instruction is a random sequence, the generated torque is a randomly varying torque, and a desired value of the torque is zero, so practically almost no effective torque is generated. A detailed analysis is given below.

Assuming that an angle between a positive direction of a rotor coordinate D axis and a positive direction of a stator coordinate α axis is θ, the relationship between a torque $T_e$ and $I_\alpha I_\beta$ in the present case is:

$$T_e = 3/2(I_\beta \cos(\theta) - I_\alpha \sin(\theta))[\psi_m + (L_d - L_q)(I_\alpha \cos(\theta) + I_\beta \sin(\theta))] \quad (3)$$

Equation (1) and equation (3) are analyzed to acquire:

$$E[T_e] = 0 \quad (4)$$

That is, the desired value of the torque is zero, and an actual motor torque is expressed as a high-frequency random fluctuation torque with an average of zero.

In operation S250, the voltage control signal in the stator coordinate system is converted into a three-phase voltage control signal, and a working state of a switching device is controlled according to the three-phase voltage control signal. The switching device here may be switching devices Q1, Q2, Q3, Q4, Q5 and Q6 shown in FIG. 1.

Figure 3:
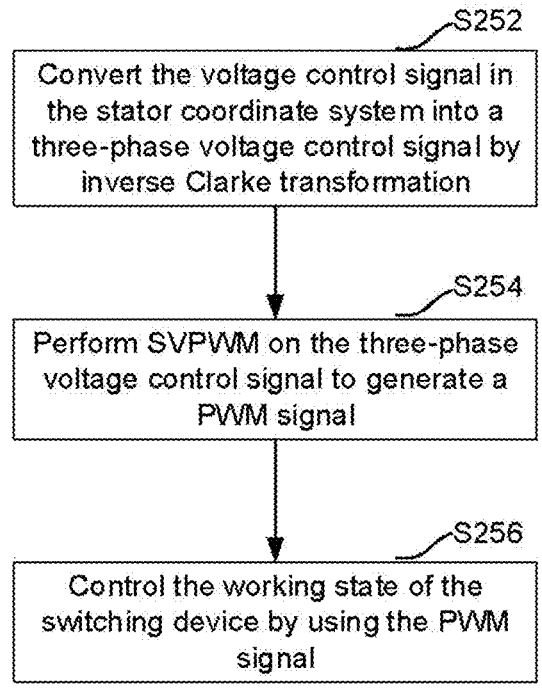
FIG. 3 is a flowchart of a DC bus discharge control method according to an embodiment of the present disclosure.

Referring to FIG. 3, the operation of converting the voltage control signal in the stator coordinate system into the three-phase voltage control signal and controlling the working state of the switching device according to the three-phase voltage control signal further includes operation S252 to operation S256.

In operation S252, the voltage control signal in the stator coordinate system is converted into the three-phase voltage control signal by inverse Clarke transformation.

In operation S254, PWM is performed on the three-phase voltage control signal to generate a PWM signal.

In operation S256, the working state of the switching device is controlled by using the PWM signal.

Further, the feedback control unit outputs a voltage instruction $U_\alpha^* U_\beta^*$ in stator coordinates through inverse Clarke transformation (simplifying a voltage loop equation on an original two-phase winding into a voltage loop equation on a three-phase winding, and transforming from a two-phase stator α-β coordinate system into a two-phase stator A-B-C coordinate system) (αβ→abc) into a three-phase voltage instruction ($U_a^*$, $U_b^*$, $U_c^*$). After the three-phase voltage instruction ($U_a^*$, $U_b^*$, $U_c^*$) is subjected to PWM (PWM is an analog control mode that modulates the bias of a transistor base or an MOS tube gate according to the change in the corresponding load to change the on time of the transistor or the MOS tube so as to change the output of a switching regulator power supply), a PWM signal of each switching device is generated to control an inverter to work, so that the motor current changes according to the current instruction $I_\alpha^* I_\beta^*$.

Specifically, the PWM wave modulation mode may be 5-step SVPWM. Since the 5-step SVPWM is selected, a generated ripple current is larger, which is more conducive to a loss current.

According to the DC bus discharge control method, current is controlled in a stator coordinate system, the current can be controlled in the stator coordinate system without a signal θ, and a motor controller can discharge, so that the problem that residual power on a high voltage DC bus cannot be quickly discharged due to the impossibility of preventing a stator current from generating a mechanical torque when a rotor position sensor fails is solved.

According to the above DC bus discharge control method, even if a rotor position sensor of a permanent magnet synchronous motor fails, high voltage relief can still be performed through a motor winding, almost no effective torque is generated to a rotor during the discharge process, and the discharge efficiency can be improved.

Referring to FIG. 2, in one of the embodiments, the DC bus discharge control system further includes operation S260 after operation S210 to operation S250.

In operation S260, when detecting that a voltage on a DC bus is lower than a preset value, the switching device is controlled to be turned off.

The preset value may be a range of voltage values that does not cause harm to the human body, such as below 60V. During the discharge process, the voltage on the DC bus is detected in real time. When the voltage on the DC bus is detected to comply with the safety voltage requirement, the motor controller stops actively discharging.

The above DC bus discharge control method automatically stops discharging after the discharge task is completed, and avoids being in the state all the time.

Figure 4:
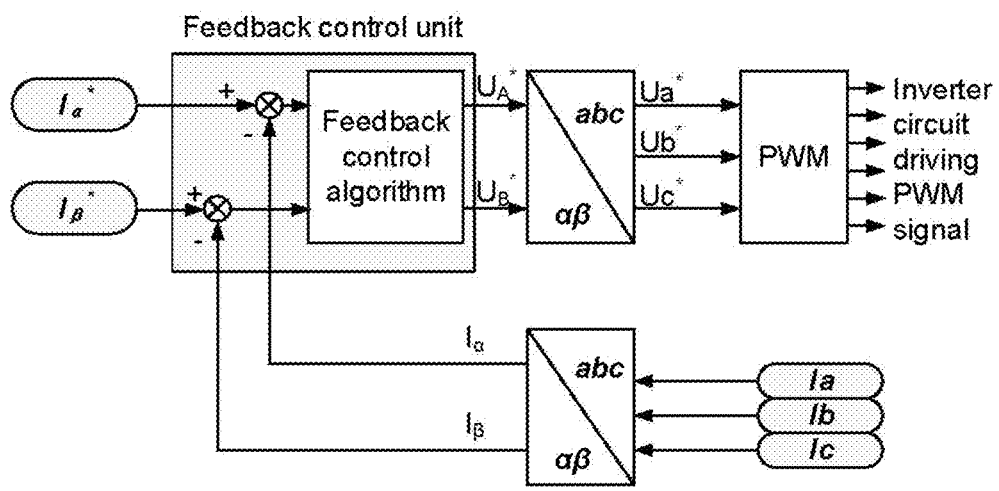
FIG. 4 is a process chart of a DC bus discharge control method according to an embodiment of the present disclosure.

Referring to FIG. 4, in one of the embodiments, according to the DC bus discharge control method, the three-phase current signal of the motor acquired by a current sensor is $I_a$, $I_b$, $I_c$, and $I_a$, $I_b$, $I_c$ is converted by Clarke transformation into a current signal $I_\alpha$, $I_\beta$ in a stator coordinate system, a random current reference instruction $I_\alpha^* I_\beta^*$ in the stator coordinate system is generated inside controller software, and the current signal $I_\alpha$, $I_\beta$ in the stator coordinate system and the random current reference instruction $I_\alpha^* I_\beta^*$ in the stator coordinate system are sent to a feedback control unit together. After the control operation, the feedback control unit outputs a voltage instruction $U_\alpha^* U_\beta^*$ in the stator coordinate system, which is subjected to Inverse Clarke transformation ($\alpha\beta \rightarrow abc$) into a three-phase voltage instruction ($U_a^*U_b^*U_c^*$). After the three-phase voltage instruction is subjected to PWM, an inverter circuit driving PWM signal that controls each of the switching devices Q1 ... Q6 is generated to control an inverter to work, so that the motor current changes according to the current instruction $I_\alpha^* I_\beta^*$.

Figure 5:
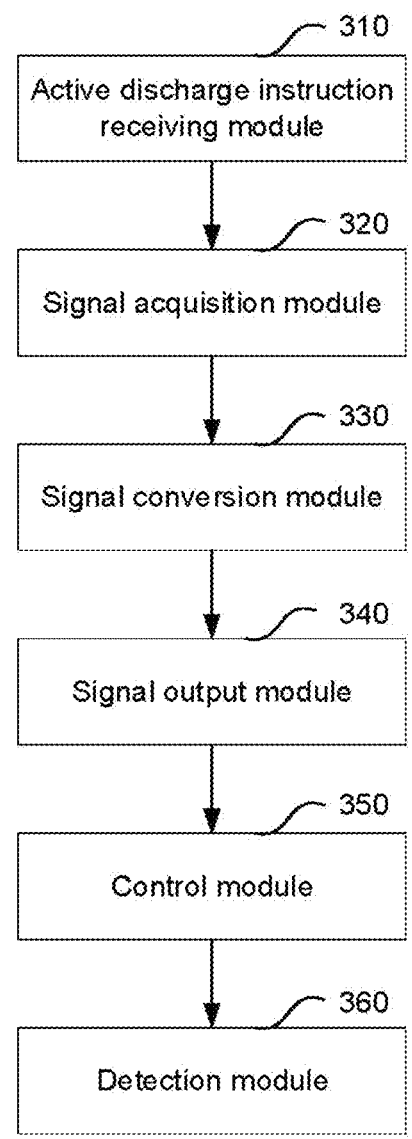
FIG. 5 is a schematic structure diagram of a DC bus discharge control system according to an embodiment of the present disclosure.

Referring to FIG. 5, the present application also provides a DC bus discharge control system, including: an active discharge instruction receiving module 310, a signal acquisition module 320, a signal conversion module 330, a signal output module 340, and a control module 350.

The active discharge instruction receiving module 310 is configured to receive an active discharge instruction.

When it is necessary to discharge current on a high-voltage bus, a motor controller receives an active discharge instruction.

The signal acquisition module 320 is configured to acquire a motor current signal according to the active discharge instruction.

The motor current signal is a motor three-phase current signal. When the active discharge instruction is received, the motor three-phase current signal may be acquired by a current sensor (the current sensor is a detection apparatus, which can sense information of a measured current and can convert the sensed information into an electrical signal or other information outputs in a required form complying with a certain standard requirement according to a certain rule, so as to meet information transmission, processing, storage, display, recording and control requirements).

The signal conversion module 330 is configured to convert the motor current signal into a current signal in a stator coordinate system.

Current coordinates ($I_\alpha$, $I_\beta$) in the stator coordinate system directly correspond to three-phase currents ($I_a$, $I_b$, $I_c$) of the motor one by one, and a conversion relationship therebetween is a constant matrix, in which matrix coefficients do not include a rotor rotation angle θ. Such a coordinate system may be regarded as a coordinate system bound to a motor stator, so it is customarily called "stator coordinate system".

Specifically, the motor current signal is $I_a$, $I_b$, $I_c$, and the motor current signal acquired by the current sensor are $I_a$, $I_b$, $I_c$. ($I_a$, $I_b$, $I_c$) is transformed by Clarke transformation (the Clarke transformation simplifies an original three-phase current into a two-phase current, and transforms from a three-phase stator A-B-C coordinate system to a two-phase stator α-β coordinate system, also known as 3/2 transformation) (abc→αβ) into a current signal $I_\alpha I_\beta$ in the stator coordinate system.

The signal output module 340 is configured to output a voltage control signal in the stator coordinate system based on the current signal in the stator coordinate system and a random current reference instruction of a preset stator coordinate system.

The random current reference Instruction of the preset stator coordinate system is generated inside the controller, the random current reference instruction of the preset stator coordinate system includes random current reference value Information, and a random current reference value of the preset stator coordinate system is $I_\alpha^* I_\beta^*$. The current signal $I_\alpha I_\beta$ in the stator coordinate system and the random current reference value of the preset stator coordinate system $I_\alpha^* I_\beta^*$ in the random current reference instruction of the preset stator coordinate system are input a feedback control unit together. After the control operation, the feedback control unit outputs a voltage control signal $U_\alpha^* U_\beta^*$ in the stator coordinate system. The random current reference instruction in the operation of outputting a voltage control signal in the stator coordinate system based on the current signal in the stator coordinate system and a random current reference instruction of a preset stator coordinate system satisfies the following conditions: desired values of the random current reference signals $I_\alpha^*$ and $I_\beta^*$ are 0, variances of the random current reference signals $I_\alpha^*$ and $I_\beta^*$ are equal, and covariances of the random current reference signals $I_\alpha^*$ and $I_\beta^*$ are 0.

Further, the $I_\alpha^* I_\beta^*$ current instruction generated inside software may be random, and may be any random sequence as long as it satisfies:

$$\begin{cases} E[I_\alpha^*] = 0 \\ E[I_\beta^*] = 0 \\ E[(I_\alpha^*)^2] = E[(I_\beta^*)^2] \\ E[I_\alpha^* I_\beta^*] = 0 \end{cases} \quad (1)$$

For example, $I_\alpha^* I_\beta^*$ may be independently selected according to the following uniform distribution:

$$f(i) = \begin{cases} \dfrac{1}{0.4 I_{rate}} & |i| \le 0.2 I_{rate} \\ 0 & |i| > 0.2 I_{rate} \end{cases} \quad (2)$$

f(i) is a probability density function of a current instruction i.

Since the current control is generally the discrete control of a fixed frequency, each control cycle has a pair of random current instructions, denoted as $I_{\alpha,k}^*$ and $I_{\beta,k}^*$, and a subscript k represents a $k^{th}$ control period. The relationship between random current instructions between different periods may be expressed by a correlation function (or power density spectrum). The time series of $I_\alpha^*$ and $I_\beta^*$ of the present disclosure may be a white noise sequence, or may be a sequence having a specific correlation function designed for other specific purposes.

Specifically, the random current reference instruction of the preset stator coordinate system is a random white noise current.

During the discharge process, the random white noise current power spectrum is wide, and the high frequency part will increase the resistance loss due to the skin effect, thereby accelerating the residual power discharge speed. Since a current instruction is a random sequence, the generated torque is a randomly varying torque, and a desired value of the torque is zero, so practically almost no effective torque is generated. A detailed analysis is given below.

Assuming that an angle between a positive direction of a rotor coordinate D axis and a positive direction of a stator coordinate α axis is θ, the relationship between a torque $T_e$ and $I_\alpha I_\beta$ in the present case is:

$$T_e = 3/2(I_\beta \cos(\theta) - I_\alpha \sin(\theta))[\psi_m + (L_d - L_q)(I_\alpha \cos(\theta) + I_\beta \sin(\theta))] \quad (3)$$

Equation (1) and equation (3) are analyzed to acquire:

$$E[T_e] = 0 \quad (4)$$

That is, the desired value of the torque is zero, and an actual motor torque is expressed as a high-frequency random fluctuation torque with an average of zero.

The control module 350 is configured to convert the voltage control signal in the stator coordinate system into a three-phase voltage control signal, and control a working state of a switching device according to the three-phase voltage control signal.

Figure 6:
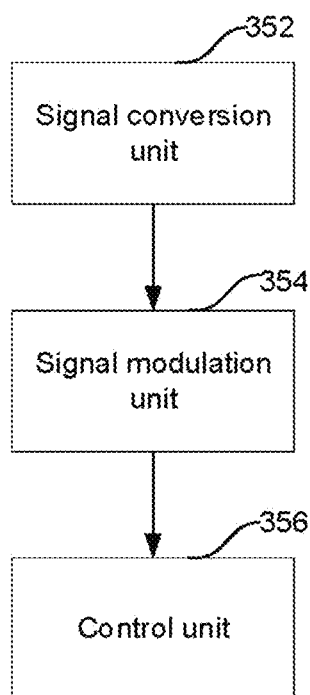
FIG. 6 is a schematic structure diagram of a DC bus discharge control system according to an embodiment of the present disclosure.

Referring to FIG. 6, the control module 350 further includes: a signal conversion unit 352, a signal modulation unit 354, and a control unit 356.

The signal conversion unit 352 is configured to convert the voltage control signal in the stator coordinate system into the three-phase voltage control signal by inverse Clarke transformation.

The signal modulation unit 354 is configured to perform PWM on the three-phase voltage control signal to generate a PWM signal.

The control unit 356 is configured to control the working state of the switching device by using the PWM signal.

Further, the feedback control unit outputs a voltage instruction $U_\alpha^* U_\beta^*$ in stator coordinates through inverse Clarke transformation (simplifying a voltage loop equation on an original two-phase winding into a voltage loop equation on a three-phase winding, and transforming from a two-phase stator α-β coordinate system into a two-phase stator A-B-C coordinate system) (αβ→abc) into a three-phase voltage instruction ($U_a^*$, $U_b^*$, $U_c^*$). After the three-phase voltage instruction ($U_a^*$, $U_b^*$, $U_c^*$) is subjected to PWM (PWM is an analog control mode that modulates the bias of a transistor base or an MOS tube gate according to the change in the corresponding load to change the on time of the transistor or the MOS tube so as to change the output of a switching regulator power supply), a PWM signal of each switching device is generated to control an inverter to work, so that the motor current changes according to the current instruction $I_\alpha^* I_\beta^*$.

Specifically, the PWM wave modulation mode selects 5-step SVPWM. Since the 5-step SVPWM is selected, a generated ripple current is larger, which Is more conducive to a loss current.

According to the DC bus discharge control system, current is controlled in a stator coordinate system, the current can be controlled in the stator coordinate system without a signal θ, and a motor controller can discharge, so that the problem that residual power on a high voltage DC bus cannot be quickly discharged due to the impossibility of preventing a stator current from generating a mechanical torque when a rotor position sensor fails is solved.

According to the above DC bus discharge control system, even if a rotor position sensor of a permanent magnet synchronous motor fails, high voltage relief can still be performed through a motor winding, almost no effective torque is generated to a rotor during the discharge process, and the discharge efficiency can be improved.

Referring to FIG. 5, in one of the embodiments, the DC bus discharge control system further includes a detection module.

The detection module is configured to control, when detecting that a voltage on a DC bus is lower than a preset value, the switching device to be turned off.

The preset value may be a range of voltage values that do not cause harm to the human body, such as below 60V. During the discharge process, the voltage on the DC bus is detected in real time. When the voltage on the DC bus is detected to comply with the safety voltage requirement, the motor controller stops actively discharging.

The above DC bus discharge control system automatically stops discharging after the discharge task is completed, and avoids being in the state all the time.

In addition, those skilled in the art can understand that all or part of the processes in the above method embodiments may be implemented by a computer program to instruct related hardware, and the program may be stored in a nonvolatile computer-readable storage medium. In the embodiments of the present disclosure, the program may be stored in a storage medium of a computer system and executed by at least one processor in the computer system to implement a flow including an embodiment of the DC bus discharge control methods as described above.

Hereby, in an embodiment, a storage medium is also provided. The storage medium has a computer program stored thereon, wherein the program is executed by a processor to implement any one DC bus discharge control method in each of the above embodiments. The storage medium may be a magnetic disk, an optical disk, a Read-Only Memory (ROM), or a Random Access Memory (RAM).

According to the computer storage medium, current is controlled in a stator coordinate system, the stored computer program implements a flow including an embodiment of the DC bus discharge control methods as described above, so that the current can be controlled in the stator coordinate system without a signal θ, and a motor controller can discharge. The problem that residual power on a high voltage DC bus cannot be quickly discharged due to the impossibility of preventing a stator current from generating a mechanical torque when a rotor position sensor fails is solved.

In addition, in one embodiment, a computer device is also provided, which includes a memory, a processor and a computer program stored on the memory and runnable on the processor, wherein the processor executes the program to implement any one DC bus discharge control method in each of the above embodiments.

According to the computer device, when the processor executes the program, current is controlled in a stator coordinate system, the current can be controlled in the stator coordinate system without a signal θ, and a motor controller can discharge, so that the problem that residual power on a high voltage DC bus cannot be quickly discharged due to the impossibility of preventing a stator current from generating a mechanical torque when a rotor position sensor fails is solved.

The technical features of the above-described embodiments may be arbitrarily combined. For the sake of brevity of description, all possible combinations of the technical features in the above embodiments are not described. However, as long as there is no contradiction between the combinations of these technical features, all should be considered as the scope of this description.

The above embodiments are merely illustrative of several implementation manners of the present disclosure with specific and detailed description, and are not to be construed as limiting the patent scope of the present disclosure. It is to be noted that a number of variations and modifications may be made by those of ordinary skill in the art without departing from the conception of the present disclosure, and all fall within the scope of protection of the present disclosure. Therefore, the scope of protection of the present disclosure should be determined by the appended claims.

What is claimed is:

1. A DC bus discharge control method, comprising:
receiving an active discharge instruction;
acquiring a motor current signal according to the active discharge instruction;
converting the motor current signal into a current signal in a stator coordinate system by Clarke transformation;
outputting a voltage control signal in the stator coordinate system based on the current signal in the stator coordinate system and a random current reference instruction of a preset stator coordinate system; and
converting the voltage control signal in the stator coordinate system into a three-phase voltage control signal, and controlling a working state of a switching device according to the three-phase voltage control signal.

2. The DC bus discharge control method as claimed in claim 1, further comprising: when detecting that a voltage on a DC bus is lower than a preset value, controlling the switching device to be turned off.

3. A non-transitory storage medium, having a computer program stored thereon, wherein the program is executed by a processor to implement the DC bus discharge control method as claimed in claim 2.

4. The DC bus discharge control method as claimed in claim 1, wherein a random current reference signal of the random current reference instruction comprises an α-axis component current and a β-axis component current, where a desired value of the α-axis component current is 0, a desired value of the β-axis component current is 0, a variance of the α- axis component current is equal to a variance of the β-axis component current, and a covariance of the α-axis component current and a covariance of the β-axis component current are 0.

5. A non-transitory storage medium, having a computer program stored thereon, wherein the program is executed by a processor to implement the DC bus discharge control method as claimed in claim 4.

6. The DC bus discharge control method as claimed in claim 1, wherein converting the voltage control signal in the stator coordinate system into the three-phase voltage control signal and controlling the working state of the switching device according to the three- phase voltage control signal further comprises:
converting the voltage control signal in the stator coordinate system into the three-phase voltage control signal by inverse Clarke transformation;
performing Pulse Width Modulation (PWM) on the three-phase voltage control signal to generate a PWM signal; and
controlling the working state of the switching device by using the PWM signal.

7. A non-transitory storage medium, having a computer program stored thereon, wherein the program is executed by a processor to implement the DC bus discharge control method as claimed in claim 6.

8. A non-transitory storage medium, having a computer program stored thereon, wherein the program is executed by a processor to implement the DC bus discharge control method as claimed in claim 1.

9. A DC bus discharge control system, comprising:
an active discharge instruction receiving module, configured to receive an active discharge instruction;
a signal acquisition module, configured to acquire a motor current signal according to the active discharge instruction;
a signal conversion module, configured to convert the motor current signal into a current signal in a stator coordinate system by Clarke transformation;
a signal output module, configured to output a voltage control signal in the stator coordinate system based on the current signal in the stator coordinate system and a random current reference instruction of a preset stator coordinate system; and
a control module, configured to convert the voltage control signal in the stator coordinate system into a three-phase voltage control signal, and control a working state of a switching device according to the three-phase voltage control signal.

10. The DC bus discharge control system as claimed in claim 9, further comprising: a detection module, configured to control, when detecting that a voltage on a DC bus is lower than a preset value, the switching device to be turned off.

11. The DC bus dischargw control system as claimed in claimed 9, wherein the control module comprises:
a signal conversion unit, configured to convert the voltage control signal in the stator coordinate system into the three-phase voltage control signal by inverse Clarke transformation;
a signal modulation unit, configured to perfom Pulse Width Modulation (PWM) on the three-phase voltage control signal to generate a PWM signal; and
a control unit, configured to control the working state of the switching device by using the PWM signal.

12. The DC bus discharge control system as claimed in claim 9, wherein a random current reference signal of the random current reference instruction comprises an α-axis component current and a β-axis component current, where a desired value of the α-axis component current is 0, a desired value of the β-axis component current is 0, a variance of the α- axis component current is equal to a variance of the β-axis component current, and a covariance of the α-axis component current and a covariance of the β-axis component current are 0.

13. A computer device, comprising a memory, a processor and a computer program that is stored on the memory and can be run on the processor, wherein the computer program is executed by the processor to implement the following program modules:
an active discharge instruction receiving module, configured to receive an active discharge instruction;
a signal acquisition module, configured to acquire a motor current signal according to the active discharge instruction;
a signal conversion module, configured to convert the motor current signal into a current signal in a stator coordinate system by Clarke transformation;
a signal output module, configured to output a voltage control signal in the stator coordinate system based on the current signal in the stator coordinate system and a random current reference instruction of a preset stator coordinate system; and
a control module, configured to convert the voltage control signal in the stator coordinate system into a three-phase voltage control signal, and control a working state of a switching device according to the three-phase voltage control signal.

14. The computer device as claimed in claim 13, wherein the computer program is executed by the processor to implement the following program module: a detection module, configured to control, when detecting that a voltage on a DC bus is lower than a preset value, the switching device to be turned off.

15. The computer device as claimed in claim 13, wherein a random current reference signal of the random current reference instruction comprises an α-axis component current and a β-axis component current, where a desired value of the α-axis component current is 0, a desired value of the β-axis component current is 0, a variance of the α-axis component current is equal to a variance of the β-axis component current, and a covariance of the α-axis component current and a covariance of the β-axis component current are 0.

16. The computer device as claimed in claim 13, wherein the control module comprises:
   a signal conversion unit, configured to convert the voltage control signal in the stator coordinate system into the three-phase voltage control signal by inverse Clarke transformation;
   a signal modulation unit, configured to perform Pulse Width Modulation (PWM) on the three-phase voltage control signal to generate a PWM signal; and
   a control unit, configured to control the working state of the switching device by using the PWM signal.

* * * * *